July 9, 1946.                J. A. PIERCE ET AL                2,403,753
                                CATALYSTS
                            Filed May 6, 1943
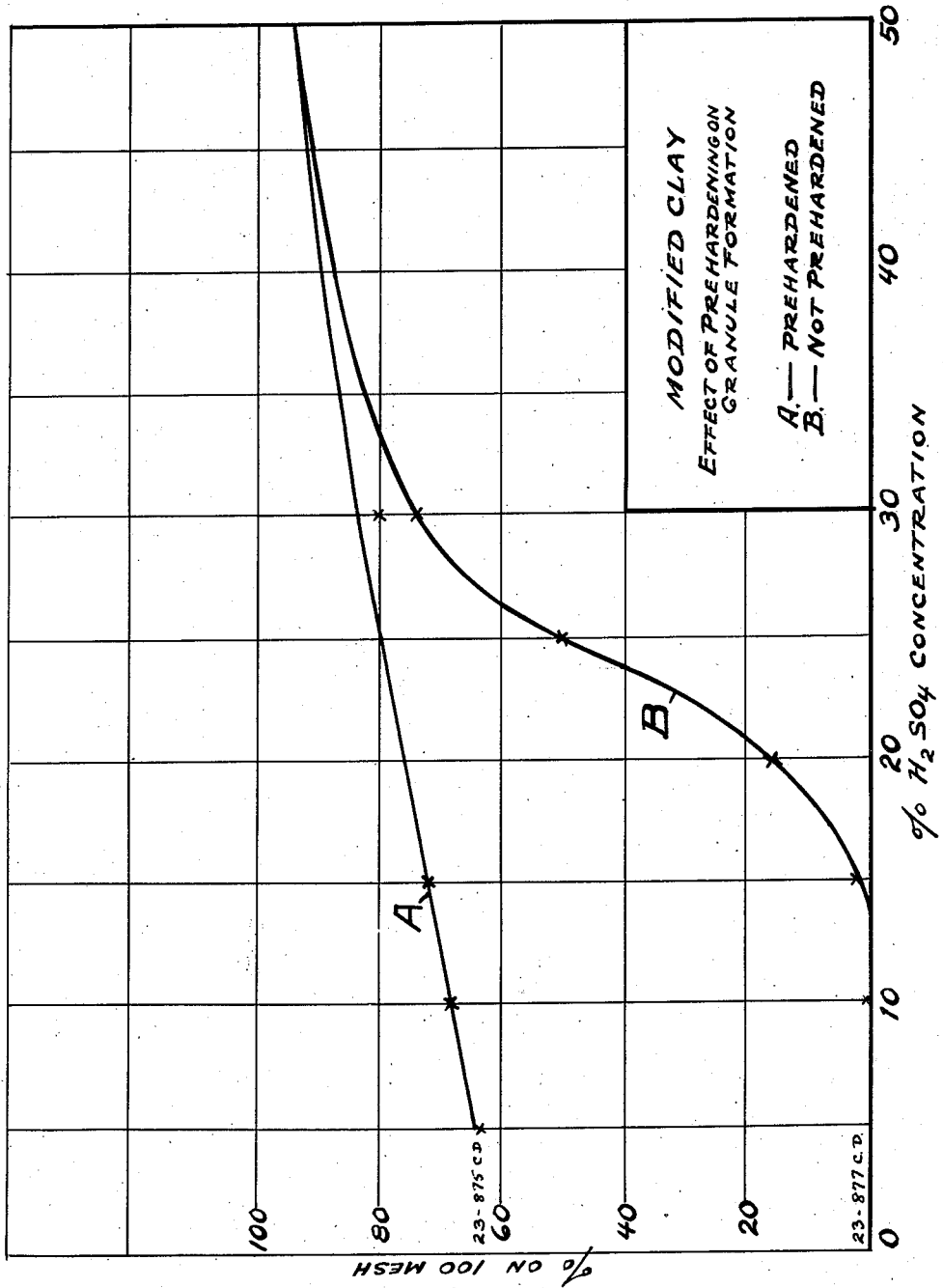

Patented July 9, 1946

2,403,753

UNITED STATES PATENT OFFICE 2,403,753

CATALYSTS

Jerry A. Pierce and William E. Spicer, Baton Rouge, La., assignors to Standard Oil Development Company, a corporation of Delaware Application May 6, 1943, Serial No. 485,822

6 Claims. (Cl. 196—52)

This invention relates to the acid treatment of clays. More particularly, it relates to a method of acid-treating clay whereby the swelling and decrepitation of the clay particles are prevented.

It is known to treat bentonite clays with inorganic acids, such as hydrochloric or sulfuric acids, to remove soluble portions of the clays, and usually the clays treated in this manner have improved activity for decolorizing lubricating oils and for use as catalysts or catalyst carriers in converting hydrocarbons.

In many operations involving the use of clay catalysts, the particle size of the clay becomes important. This is particularly true in hydrocarbon conversion reactions in which the powdered, treated clay is suspended in the gases or vapors being converted. In such processes the clay is introduced into the gas or vapor from a catalyst hopper through a standpipe having sufficient height to prevent blowback by the pressure of the incoming vapors. The clay catalyst is thus conveyed through the entire system as a suspension in the gases or vapors. Catalyst particles entrained in effluent vapors and gases are effectively separated in centrifugal separators, such as cyclone separators, and electrical precipitators, such as Cottrell precipitators. This type of process is often called a "fluid catalyst" process.

It is usual to introduce a gas at various points along the standpipe to maintain the clay particles in a pseudo fluid condition. For efficient operation the clay in the standpipe should contain substantially no particles greater than 100 mesh and not more than 30% having diameters less than 15 to 20 microns. If substantially more than 30% of the clay particles have diameters less than 15 to 20 microns, it is necessary to subject the clay to a mechanical separation to remove these small particles, otherwise it will be difficult to prevent catalyst losses from the system in the cyclone separators and the Cottrell precipitators. Furthermore, this separation step adds materially to the cost of the process as a whole, since the separation equipment is expensive and the particles separated are of no value. The importance of particle size in such a process becomes particularly important when it is realized that 30 to 65% of the clay prepared by the usual methods must be discarded as of no value.

The problem of the particle size is also of importance in decolorizing lubricating oils. There are usually two processes for decolorizing these oils. The oil may be filtered through the clay in a process known as contact filtration, or the oil may be percolated through a column of the clay in a process known as clay percolation. Contact clays are usually pulverized so that over 95% passes through a 200 mesh screen. Much of the clay is finer than 300 mesh. While fine division is usually beneficial in increasing the rate of decolorization, if some of the clay is too fine, it may retard the filtering operation and it may be necessary to mix a filter aid with the clay to hasten the filtering rate.

Clays used for decolorizing oils by percolation are coarser than contact clays. In comparing materials of definite particle size for percolation, much of the material is lost to fines which are not always utilized. Thus, in crushing clays to particles of sizes between 10 and 90 mesh, the loss of the materials to fines is 20 to 25%.

It is therefore one object of this invention to prepare a powdered clay which has a minimum amount of fine particles.

It is a further object of this invention to subject clay suitable as a carrier or as a catalyst in hydrocarbon conversion reactions to a preliminary treatment whereby the clay is conditioned so that upon subsequent acid-treating and grinding to the desired size, a minimum amount of particles having a diameter less than 20 microns is formed.

Still another object of this invention is to prepare a powdered catalyst for use in fluid catalyst processes which contains such a small percentage of undersized particles that little or no separation is required.

In copending application Serial No. 454,402, filed August 11, 1942, there has been described a process for the preparation of active bentonite clays by treating them with large quantities of sulfuric acid of low concentration, and subsequently impregnating the clays with a metallic oxide or other desired material. However, it has been observed that the large amount of dilute acid used causes the clay to swell and decrepitate to such an extent that the lumps break up and give rise to much smaller particles, a large portion of which is unsuitable for some processes using powdered clay.

This invention, therefore, is an improvement over the process described in Serial No. 454,402, although it may be used advantageously in connection with any other process for the acid activation of clay.

The natural clays are aluminum silicates containing certain impurities. It is believed that the alumina present in the clay is not all in an active form or state for use as a catalyst but when activating the clay with acid some of the alumina and impurities are removed and the resulting clay has increased activity. However, due to the natural swelling of clays in water and in weak acid solutions, the clay particles tend to break up into fine particles, many of which are less than 20 microns in diameter and hence unsuitable for use in such operations as hydrocarbon conversions or oil decoloration.

In the process of the present invention, the bentonite clay is preliminarily treated for a short time with an acid having a concentration of at least 50% by weight whereby the clay is conditioned to such an extent that when it is subsequently diluted with water to the desired concentration, the tendency of the clay particles to swell and break up is largely overcome. Instead, hard granules are formed which may be ground to any desired size without the formation of undesirable fines. It is, of course, within the scope of this invention to deposit alumina in a more active form, or any other catalytically active material, on the insoluble skeleton of activated clay remaining after the treatment with the dilute acid. Since the process of this invention results in a great reduction in the amount of catalyst which must be rejected because of size, it follows that the catalyst is produced at a much reduced cost and may be used instead of the more expensive synthetically prepared silica-alumina catalyst.

The catalyst prepared according to this invention may be used for the decolorization of lubricating oils, or it may be used for the conversion of hydrocarbons as a suspension in the gases or vapors being converted. When using a suspension of catalyst in hydrocarbons, the fouled catalyst is separated from the reaction products and is regenerated. Because of its lower cost, the catalyst prepared according to this invention may be substituted for synthetically prepared catalysts and substantially the same results obtained.

The catalyst prepared according to this invention may be used to produce motor gasoline from higher boiling stocks, aviation gasoline from suitable stocks, such as light gas oils and the like, or for the preparation of finished lubricating oils from bright stocks. These catalysts may also be used to produce butylenes from hydrocarbons and for recracking catalytically cracked naphthas.

More specifically, this invention is directed to the treatment of a clay, such as bentonite from the Cheto bed in Arizona, having substantially the following composition on a dry basis:

| | Per cent by weight |
|---|---|
| $SiO_2$ | 67.8 |
| $Al_2O_3$ | 19.1 |
| $Fe_2O_3$ | 2.4 |
| $CaO$ | 3.7 |
| $MgO$ | 7.0 |
| $TiO_2$ | 0.3 |
| $SO_3$ | Trace |

In one form of this invention, the raw clay is dried for about 6 hours at a temperature of about 200° to 250° F. and pulverized or broken up into small lumps approximating 4 to 6 mesh. The time in this drying step may be varied as the drying step is merely used to remove substantially all of the easily removable volatile material. However, this drying step may be omitted if the amount of total volatile material is known. After treatment at this temperature there is still some volatile material left. In order to determine this residual volatile material, it is the usual practice to take a small amount of the partly dried clay and heat it to a temperature of about 1600° F. This more drastic treatment removes about 15 to 20% of volatile material from the clay. This clay is known as "volatile-free" clay.

The bentonite clay, after having been heated to about 200° F. to 250° F., is immersed for about 15 to 30 minutes in a dilute solution containing 75 lbs. of 1.84 density sulfuric acid per 100 lbs. of the original clay, the acid having a concentration of about 50% by weight, i. e., 50 grams of acid dissolved in 50 grams of water. By this treatment, the swelling and decrepitating properties of the clay are destroyed and the material becomes hard and brittle. The mixture is then diluted to an acid concentration of 12% by weight and stirred for about 6 hours at 190° F. and then diluted with water, filtered and washed. The filtered, treated clay is then dried at a temperature of about 200° F. to 250° F. for about 16 hours. The drying time is not critical, and shorter times may be used.

To show the improved results obtained by using the process of this invention, two parallel series of acid treated clay samples were prepared. Raw clay was treated with sulfuric acid having concentrations respectively of 5, 10, 12, 15, 20, 25, 30 and 50% by weight. In one series the raw clay was immersed in 50% sulfuric acid for 30 minutes before the acid solution was diluted with water to the desired concentration. In the other series the clay was not treated with the more concentrated acid before being treated with dilute acid. The attached graph shows that when the clay is not conditioned with acid having a concentration of at least 50%, an acid concentration of at least 25% is necessary to produce an appreciable amount of clay having the desired particle size and that a concentration of 30% is necessary to produce a powdered clay, 75% of which is retained on a 100 mesh screen indicated on the graph as "% on 100 mesh." On the other hand, when the clay is first treated with an acid having a concentration of 50%, then the concentration of the acid in the second step may be as low as 5% and still over 60% of the particles will be retained on a 100 mesh screen.

Thus, the data in the graph show that when the clay is treated for a short time with an acid having a concentration of at least 50% by weight preliminary to extracting the alumina and impurities with acid of relatively low concentration, hard, brittle granules are formed which show no tendency to swell or decrepitate upon prolonged treatment with the dilute acid. Furthermore, these granules may be ground to any desired size without any material formation of undesired fines.

Subsequent classification by Roller test analyses of acid-treated clay formed with and without hardening showed that when the clay particles were treated with a dilute acid solution containing 75 lbs. of 1.84 sp. gravity $H_2SO_4$ to each 100 lbs. of original dry clay and having a concentration of 12% by weight, the hardened or pretreated clay contained only 23.2% of fines which were less than 20 microns in diameter while the unhardened or non-pretreated clay contained from 41 to 71% fines having a diameter less than 20 microns. The amount of fines in the hardened clay was so small that this material could be used in a powdered catalyst operation without the necessity of mechanically separating the fines. On the other hand, the amount of fines in the unhardened clay was so great that it was necessary to separate them mechanically before using them. This separation resulted in a loss of about 20% to 50% of the original clay.

The modified clay produced according to this invention has had a large portion of the alumina and many of the impurities removed by the treatment with the dilute acid. The acid-insoluble material which remains is a porous skeleton mass which contains some silica and forms an ideal support for catalytic material. Accordingly, a small amount of alumina or other active ingredient may be precipitated on the remaining skeleton to raise the proportion of alumina in the treated clay and to reimpregnate it with a catalytically active alumina or other material as described in copending application Serial No. 454,402. It is also within the province of this invention to use the treated clay alone as a catalyst or as a contact material without impregnating in any other way.

It is therefore obvious that the process of the present invention is an improvement on the processes of acid-treating clay and provides a method whereby losses incidental to fines may be largely eliminated and that the resulting treated clay is in such a hardened condition that it may be used to produce particles of any desired size without the undue formation of fines. It also reduces the amount of fines formed by attrition when using this clay in various processes.

The nature and objects of the present invention having thus been set forth and specific examples of the same given, what is claimed as new and useful and desired to be secured by Letters Patent is:

1. In the activation of bentonite clays by treating them with dilute sulfuric acid, the method of preventing the swelling and decrepitation of the clay consisting in first immersing the clay in a solution of sulfuric acid having a concentration of 50% by weight and then treating the clay with a dilute acid having a concentration not greater than 30%.

2. In the activation of bentonite clays by treating them with dilute sulfuric acid, the method of preventing the swelling and decrepitation of the clay consisting in first treating the clay for 15 to 30 minutes with a solution of sulfuric acid having a concentration of 50% by weight and then treating the clay with a dilute acid having a concentration not more than 30% for about six hours.

3. A process for treating natural bentonite clays to produce inactive clays the particle size of which have diameters greater than 20 microns which comprises immersing the raw, natural bentonite clays for at least 15 minutes in sulfuric acid having concentration of at least 50% by weight and then treating the clay for about six hours with sulfuric acid having a concentration between 5 and 30% by weight to remove alumina and impurities.

4. A process for treating natural bentonite clays to produce active clays, the particle sizes of which have diameters greater than 20 microns, which comprises immersing the raw natural bentonite clay for 30 minutes in sulfuric acid having a concentration of 50% by weight and then treating the clay for about 6 hours with sulfuric acid having a concentration of about 12% by weight to remove alumina and impurities.

5. In the catalytic conversion of hydrocarbons wherein the conversion is effected in the presence of powdered catalysts, the step of employing as a catalyst a natural bentonite clay treated for a short time with sulfuric acid having a concentration of 50% and then for a much longer time with a relatively large amount of a dilute acid to remove soluble constituents and some alumina and then reimpregnating with alumina.

6. A process for treating natural bentonite clays to produce active catalysts suitable for use as conversion catalysts for hydrocarbons, which comprises treating the raw natural bentonite clay with about 75 lbs. of sulfuric acid having a specific gravity of 1.84 and a concentration of 50% per 100 lbs. of clay and after 30 minutes diluting the acid to a concentration of about 12% by weight, allowing the clay to remain in contact with the dilute acid for about six hours, filtering the resulting mixture and washing the treated clay, adding an aqueous solution of a compound to the treated clay and precipitating a water-insoluble compound on the treated clay.

JERRY A. PIERCE.
WILLIAM E. SPICER.